(12) United States Patent
Tsai et al.

(10) Patent No.: US 10,921,981 B2
(45) Date of Patent: Feb. 16, 2021

(54) ELECTRONIC DEVICE AND MODE SWITCHING METHOD OF THEREOF

(71) Applicants: Meng-Huan Tsai, Taipei (TW); Yen-Hua Hsiao, Taipei (TW); Yun-Tung Pai, Taipei (TW); Chih-Yuan Lee, Taipei (TW); Chien-Hao Ho, Taipei (TW); Chia-Hua Wu, Taipei (TW); Kung-Ju Chen, Taipei (TW); Chia-Chi Lin, Taipei (TW); Chia-Chi Sun, Taipei (TW)

(72) Inventors: Meng-Huan Tsai, Taipei (TW); Yen-Hua Hsiao, Taipei (TW); Yun-Tung Pai, Taipei (TW); Chih-Yuan Lee, Taipei (TW); Chien-Hao Ho, Taipei (TW); Chia-Hua Wu, Taipei (TW); Kung-Ju Chen, Taipei (TW); Chia-Chi Lin, Taipei (TW); Chia-Chi Sun, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/278,177

(22) Filed: Feb. 18, 2019

(65) Prior Publication Data

US 2020/0104042 A1 Apr. 2, 2020

(30) Foreign Application Priority Data

Sep. 27, 2018 (TW) .............................. 107134184 A

(51) Int. Cl.
*G06F 3/0488* (2013.01)
*G06F 3/041* (2006.01)

(52) U.S. Cl.
CPC ........ *G06F 3/04886* (2013.01); *G06F 3/0412* (2013.01); *G06F 3/0416* (2013.01)

(58) Field of Classification Search
CPC .................................................. G06F 3/04886
(Continued)

(56) References Cited

U.S. PATENT DOCUMENTS

| 2014/0160022 | A1* | 6/2014 | Stewart | .................. | G06F 1/169 |
| | | | | | 345/160 |
| 2016/0306449 | A1* | 10/2016 | de los Reyes | ...... | G06F 3/03547 |
| 2019/0073003 | A1* | 3/2019 | Xu | ...................... | G06F 3/03545 |

FOREIGN PATENT DOCUMENTS

| CN | 101751175 | 6/2010 |
| CN | 201499196 | 6/2010 |

(Continued)

OTHER PUBLICATIONS

"Office Action of Taiwan Counterpart Application", dated Jun. 13, 2019, pp. 1-13.

*Primary Examiner* — Long D Pham
(74) *Attorney, Agent, or Firm* — JCIPRNET

(57) ABSTRACT

An electronic device includes a keyboard module, a silicone film, a light-emitting module, and a touch module. The keyboard module has a plurality of buttons and a point stick. The silicone film has a virtual touch region. The light-emitting module is configured below the silicone film and corresponds to the virtual touch region. The light-emitting module includes a first light-emitting unit and a second light-emitting unit. The touch module is configured below the silicone film and corresponds to the virtual touch region. The touch module includes a control chip and a sensing layer. The point stick, the first light-emitting unit, the second light-emitting unit, and the sensing layer are electrically connected to the control chip, respectively.

18 Claims, 10 Drawing Sheets

(58) Field of Classification Search
USPC .......................................................... 345/173
See application file for complete search history.

(56) References Cited

FOREIGN PATENT DOCUMENTS

| | | |
|---|---|---|
| CN | 103425337 | 12/2013 |
| TW | 201439815 | 10/2014 |
| TW | 201804303 | 2/2018 |

* cited by examiner

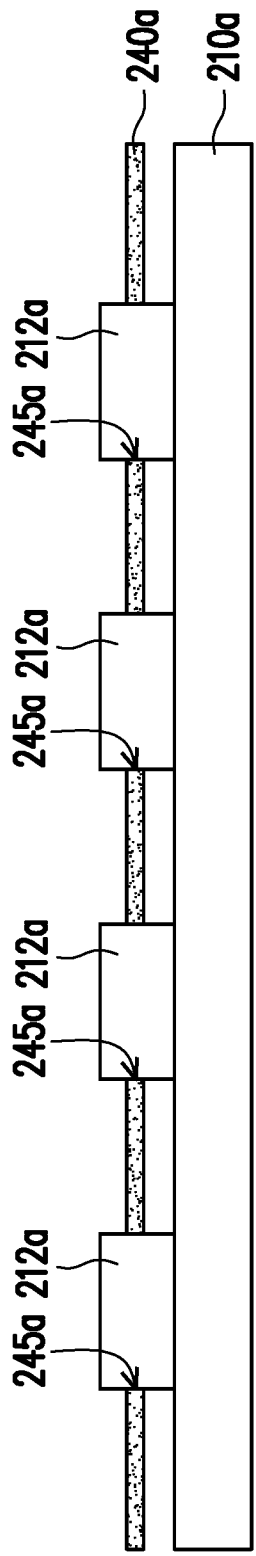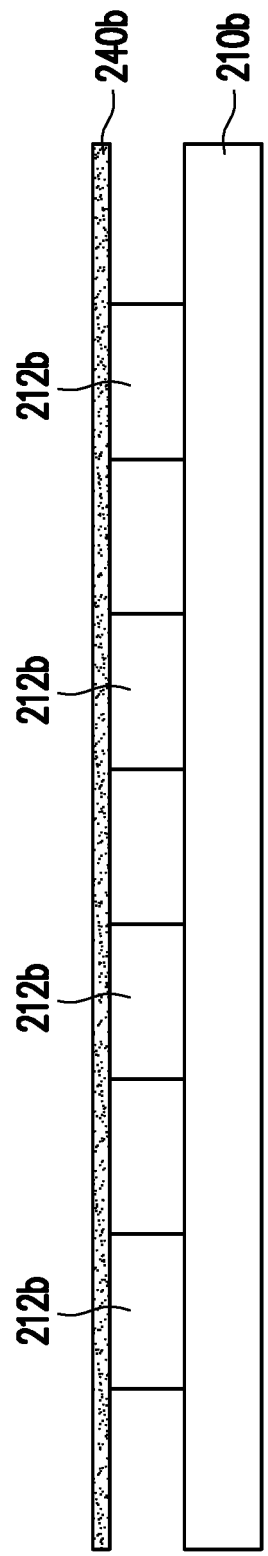
FIG. 5A
FIG. 5B

ELECTRONIC DEVICE AND MODE SWITCHING METHOD OF THEREOF

CROSS-REFERENCE TO RELATED APPLICATION

This application claims the priority benefit of Taiwan application serial no. 107134184, filed on Sep. 27, 2018. The entirety of the above-mentioned patent application is hereby incorporated by reference herein and made a part of this specification.

TECHNICAL FIELD

The disclosure relates to an electronic device and a mode switching method, and more particularly to an electronic device having a plurality of operation modes and a mode switching method of the electronic device.

DESCRIPTION OF RELATED ART

In general, the most significant difference between a commercial computer and a normal computer is that the commercial computer has a point stick which can perform functions in place of the functions that can be performed by a mouse, so as to allow a user to perform the functions of the mouse even when the mouse cannot be functioned. Besides, plural physical buttons corresponding to the functions of the point stick are correspondingly arranged on an operation surface of the host, and the physical function buttons are located between a touch pad and general keyboard buttons and occupy a portion of the operation surface of the host. As a result, the volume of the commercial computer cannot be effectively reduced, and the space occupied by elements arranged on the operation surface of the host cannot be effectively saved, thus failing to meet the current design requirements for light weight and compactness.

SUMMARY

The disclosure provides an electronic device that conforms to the current design requirements for light weight and compactness.

In an embodiment, an electronic device including a keyboard module, a silicone film, a light-emitting module, and a touch module is provided. The keyboard module has a plurality of buttons and a point stick. The silicone film has a virtual touch region. The light-emitting module is disposed below the silicone film and corresponds to the virtual touch region. The light-emitting module includes a first light-emitting unit and a second light-emitting unit. The touch module is disposed below the silicone film and corresponds to the virtual touch region. The touch module includes a control chip and a sensing layer. The point stick, the first light-emitting unit, the second light-emitting unit, and the sensing layer are electrically connected to the control chip, respectively.

According to an embodiment of the disclosure of the disclosure, the light-emitting module is located between the silicone film and the touch module.

According to an embodiment of the disclosure, when a first mode is activated by pressing the virtual touch region of the silicone film, the control chip drives the first light-emitting unit to emit light and displays positions of a plurality of first virtual buttons in the virtual touch region.

According to an embodiment of the disclosure, in the first mode, the control chip drives the sensing layer to activate a position sensing function of the sensing layer and a cursor control function of the sensing layer but deactivate a cursor control function of the point stick.

According to an embodiment of the disclosure, when a second mode is activated by pressing the point stick of the keyboard module, the control chip drives the second light-emitting unit to emit light and displays positions of a plurality of second virtual buttons in the virtual touch region.

According to an embodiment of the disclosure, in the second mode, the control chip drives the sensing layer to activate a position sensing function of the sensing layer but deactivate a cursor control function of the sensing layer and activate a cursor control function of the point stick.

According to an embodiment of the disclosure, the second virtual buttons are located between the first virtual buttons and the buttons.

According to an embodiment of the disclosure, the touch module has a first surface and a second surface opposite to each other. The sensing layer covers the first surface, and the control chip is located on the second surface.

According to an embodiment of the disclosure, the touch module further includes a metal film button disposed on the second surface and electrically connected to the control chip.

According to an embodiment of the disclosure, the first light-emitting unit includes a plurality of first light-emitting diodes separated from each other. The second light-emitting unit includes a plurality of second light-emitting diodes separated from each other.

According to an embodiment of the disclosure, the first light-emitting diodes surround the second light-emitting diodes.

According to an embodiment of the disclosure, the electronic device further includes a display unit, and the keyboard module, the light-emitting module, and the touch module define a host. The display unit is pivoted to the host and electrically connected to the host.

In an embodiment, an electronic device including a keyboard module, a protection film, a light-emitting module, and a touch module is provided. The keyboard module has a plurality of buttons and a point stick. The protection film has an outer surface and an inner surface. The inner surface has light-permeable patterns of a plurality of first virtual buttons and light-permeable patterns of a plurality of second virtual buttons. The light-emitting module is disposed below the protection film and includes a first light-emitting unit and a second light-emitting unit respectively corresponding to the light-permeable patterns of the first virtual buttons and the light-permeable patterns of the second virtual buttons. The touch module is disposed below the protection film.

According to an embodiment of the disclosure, the protection film includes a transparent body layer and a non-transparent ink layer. The non-transparent ink layer is coated on the transparent body layer to define the light-permeable patterns of the first virtual buttons and the light-permeable patterns of the second virtual buttons.

According to an embodiment of the disclosure, the protection film includes a non-transparent body layer and a groove region. The non-transparent body layer has a first thickness. The groove region is distributed on the non-transparent body layer and has a second thickness. The second thickness is less than the first thickness to define the light-permeable patterns of the first virtual buttons and the light-permeable patterns of the second virtual buttons.

According to an embodiment of the disclosure, the electronic device further includes a control chip electrically connected to the point stick, the first light-emitting unit, the second light-emitting unit, and the touch module.

In an embodiment, a mode switching method of an electronic device includes providing the electronic device described above, detecting whether a trigger signal exists by the control chip, and if the trigger signal does not exist, maintaining an existing state or an existing function of the first light-emitting unit, the second light-emitting unit, the touch module, and the point stick.

According to an embodiment of the disclosure, if the trigger signal exists and is a trigger signal of the touch module, the mode switching method includes: turning on the first light-emitting unit, turning off the second light-emitting unit, activating a cursor control function of the touch module, activating a position sensing function of the touch module, and deactivating a cursor control function of the point stick.

According to an embodiment of the disclosure, if the trigger signal exists and is a trigger signal of the point stick, the mode switching method includes: turning off the first light-emitting unit, turning on the second light-emitting unit, deactivating a cursor control function of the touch module, activating a position sensing function of the touch module, and activating a cursor control of the point stick.

According to an embodiment of the disclosure, if the trigger signal exists and is a time trigger signal, the mode switching method includes: turning off the first light-emitting unit, turning off the second light-emitting unit, activating a cursor control function of the touch module, activating a position sensing function of the touch module, and deactivating a cursor control function of the point stick.

In view of the above, in the design of the electronic device provided herein, the silicone film has the virtual touch region, and the light-emitting module and the touch module are disposed corresponding to the virtual touch region. In the virtual touch region, the display of the first light-emitting unit and the second light-emitting unit of the light-emitting module can provide two different operation modules for the user. Compared with the electronic device provided in the related art, the electronic device provided herein contributes to the reduction of the layout space of the physical function buttons corresponding to the point stick and has the advantages of small volume and compactness.

In order to make the aforementioned and other features and advantages of the disclosure comprehensible, embodiments accompanied with figures are described in detail below.

BRIEF DESCRIPTION OF THE DRAWINGS

FIG. 5A and FIG. 5B are schematic cross-sectional views illustrating the way to arrange a keyboard module and a silicone film according to several embodiments of the disclosure.

DESCRIPTION OF THE EMBODIMENTS

Figure 1:
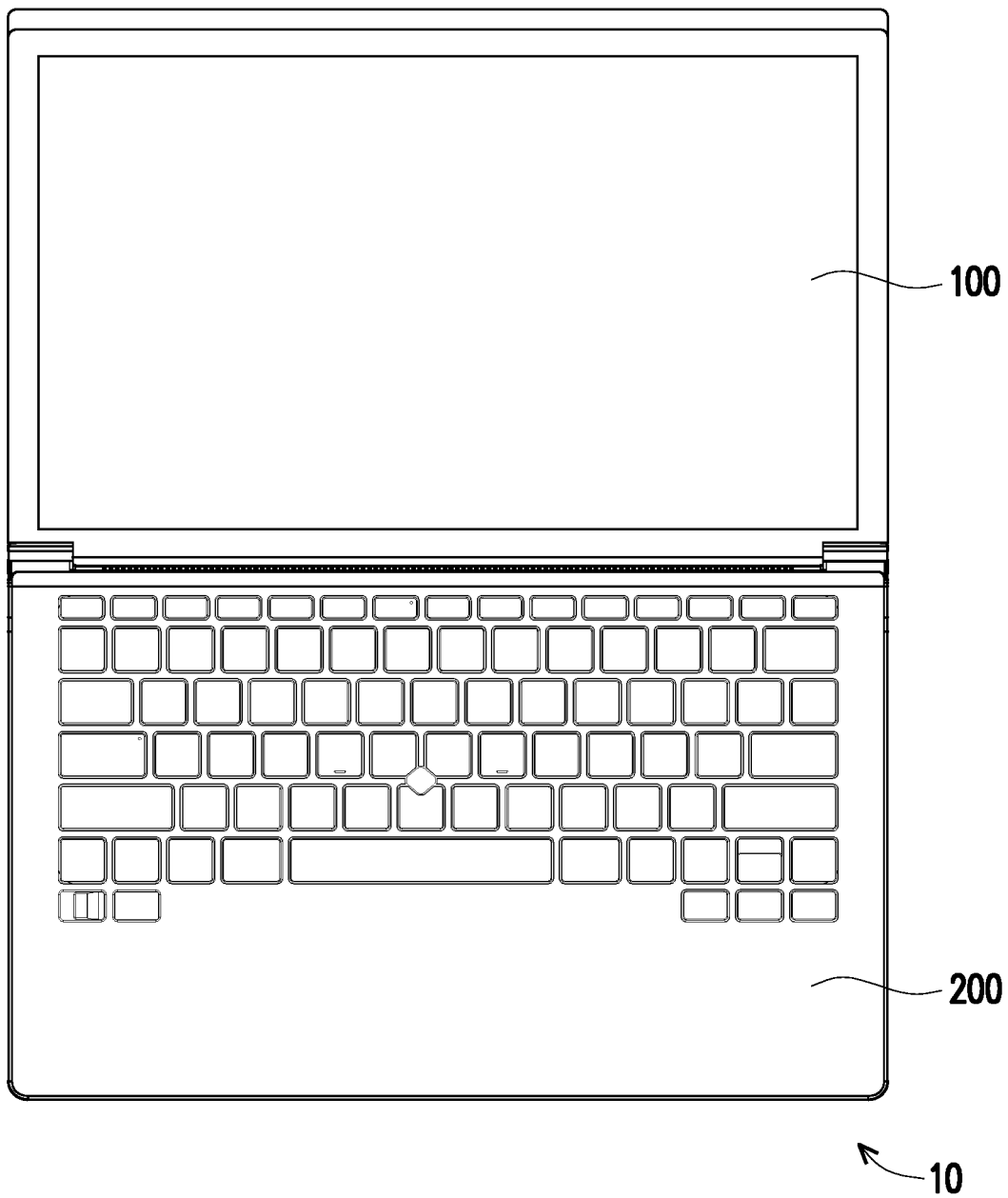
FIG. 1 is a schematic view illustrating an electronic device according to an embodiment of the disclosure.
Figure 2A:
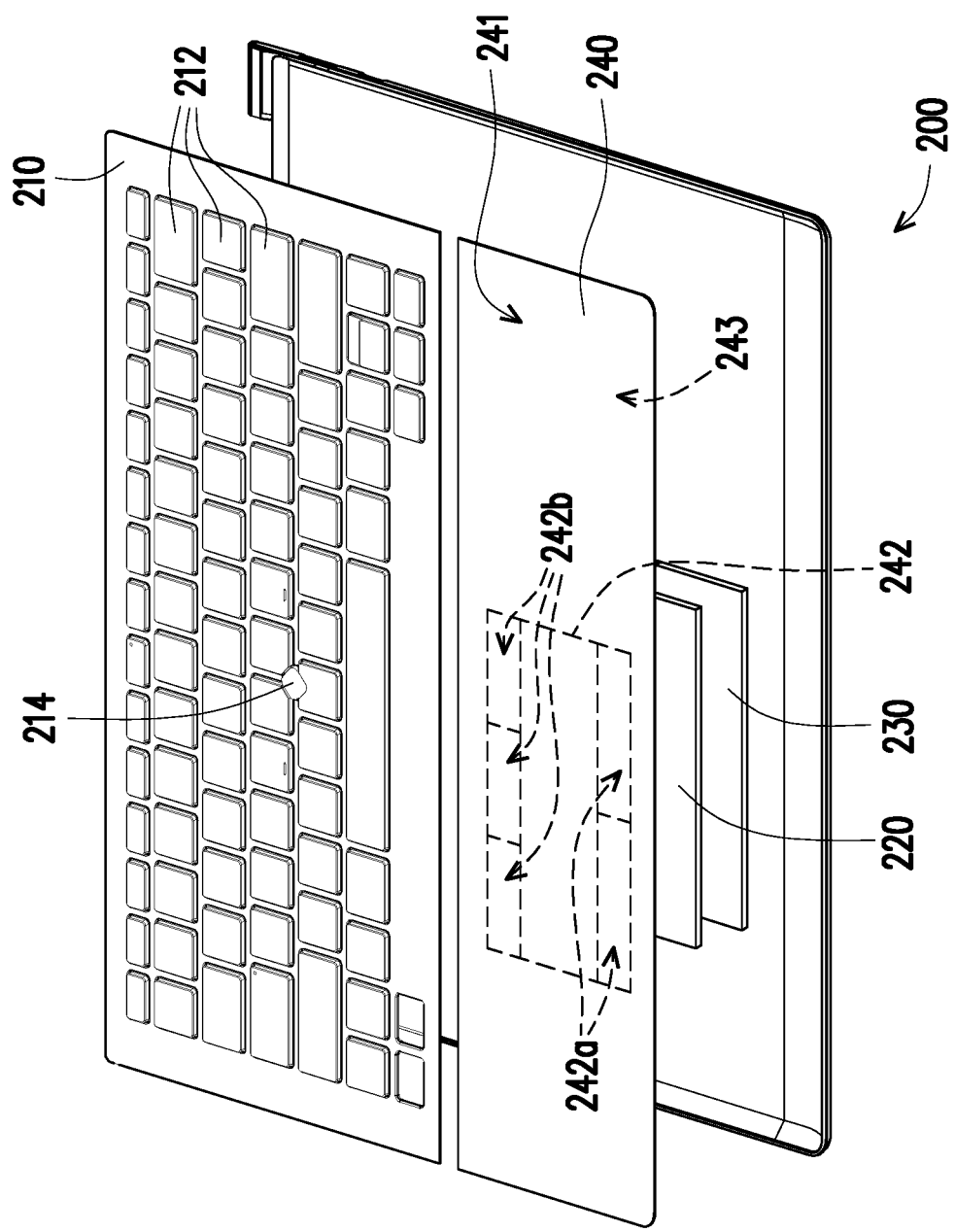
FIG. 2A is a schematic three-dimensional exploded view illustrating the keyboard module, the light-emitting module, and the touch module in the electronic device depicted in FIG. 1.
Figure 2B:
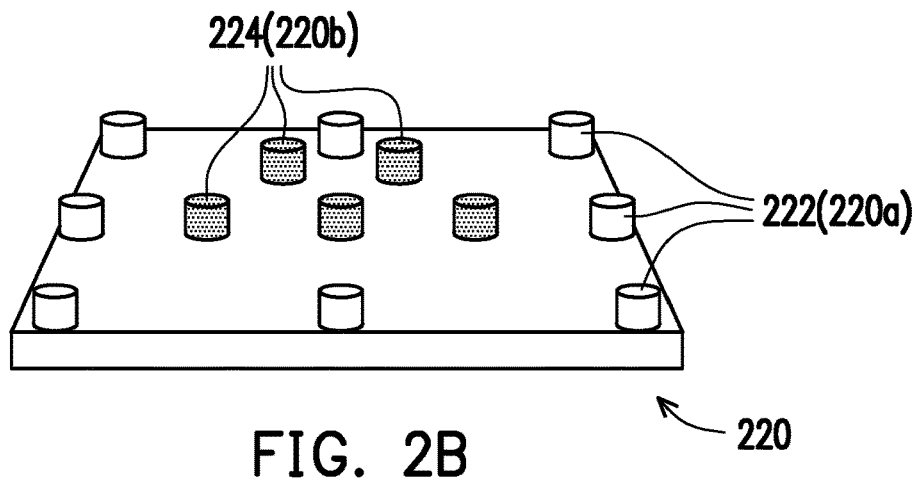
FIG. 2B is a schematic three-dimensional view illustrating the light-emitting module depicted in FIG. 2A.
Figure 2C:
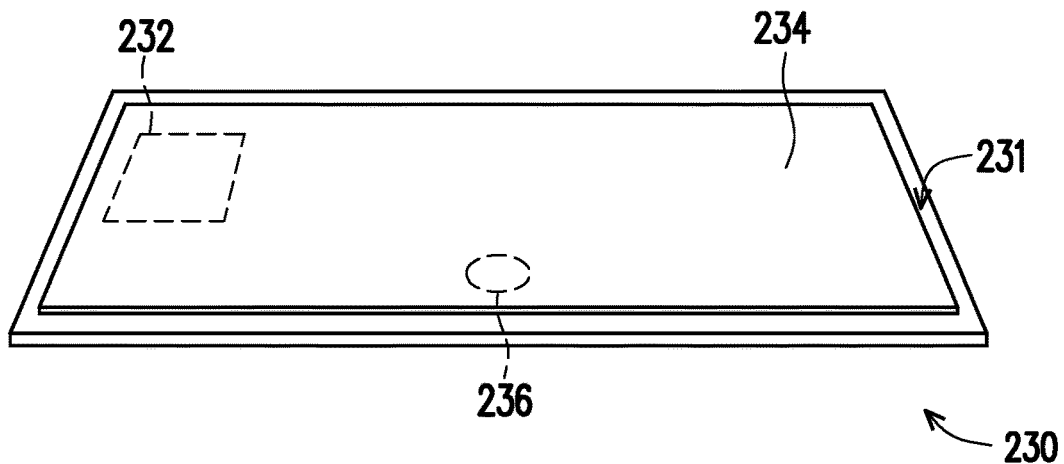
FIG. 2C is a schematic three-dimensional view illustrating the first surface of the touch module depicted in FIG. 2A.
Figure 2D:
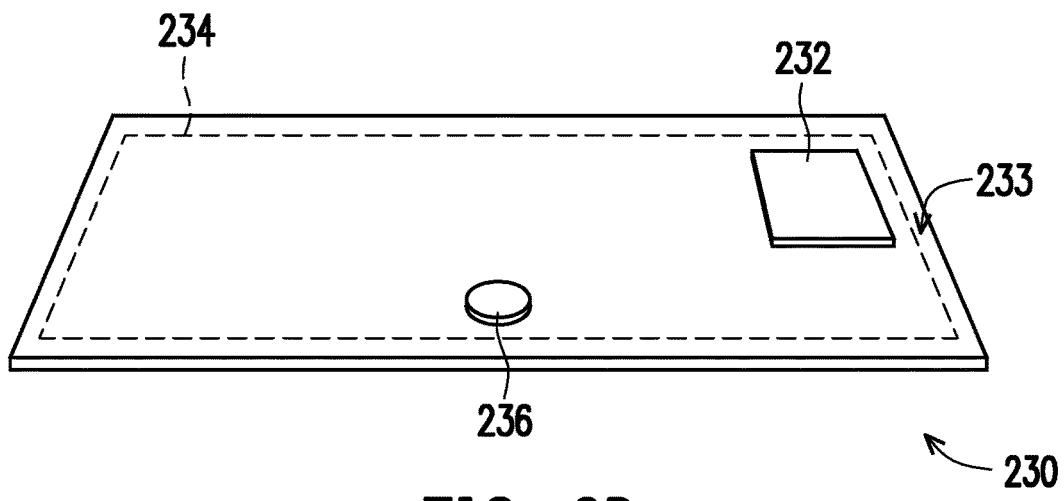
FIG. 2D is a schematic three-dimensional view illustrating the second surface of the touch module depicted in FIG. 2A.
Figure 2E:
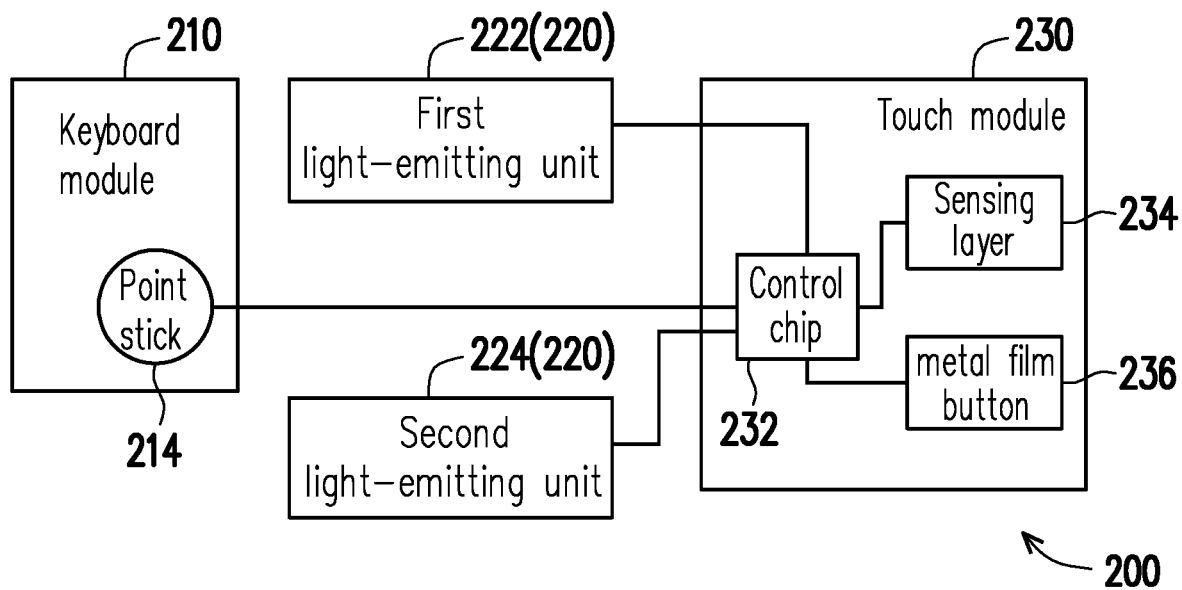
FIG. 2E is a block view illustrating electrical connections of the keyboard module, the light-emitting module, and the touch module in the electronic device depicted in FIG. 1.

FIG. 1 is a schematic view illustrating an electronic device according to an embodiment of the disclosure. FIG. 2A is a schematic three-dimensional exploded view illustrating the keyboard module, the light-emitting module, and the touch module in the electronic device depicted in FIG. 1. FIG. 2B is a schematic three-dimensional view illustrating the light-emitting module depicted in FIG. 2A. FIG. 2C is a schematic three-dimensional view illustrating the first surface of the touch module depicted in FIG. 2A. FIG. 2D is a schematic three-dimensional view illustrating the second surface of the touch module depicted in FIG. 2A. FIG. 2E is a block view illustrating electrical connections of the keyboard module, the light-emitting module, and the touch module in the electronic device depicted in FIG. 1.

With reference to FIG. 1, FIG. 2A, FIG. 2B, FIG. 2C, FIG. 2D, and FIG. 2E, in this embodiment, an electronic device 10 includes a keyboard module 210, a silicone film 240, a light-emitting module 220, and a touch module 230. The keyboard module 210 has a plurality of buttons 212 and a point stick 214. The silicone film 240 has a virtual touch region 242. The light-emitting module 220 is disposed below the silicone film 240 and corresponds to the virtual touch region 242. The light-emitting module 220 includes a first light-emitting unit 220a and a second light-emitting unit 220b. The touch module 230 is disposed below the silicone film 240 and corresponds to the virtual touch region 242. The touch module 230 includes a control chip 232 and a sensing layer 234. The point stick 2144, the first light-emitting unit 220a, the second light-emitting unit 220b, and the sensing layer 234 are electrically connected to the control chip 232, respectively.

In detail, as shown in FIG. 1 and FIG. 2A, the electronic device 10 provided in the embodiment further includes a display unit 100, the keyboard module 210, the light-emitting module 220, and the touch module 230 can define a host 200, and the display unit 100 is pivoted to the host 200 and electrically connected to the host 200. Herein, the electronic device 10 is, for instance, a commercial notebook computer, and the display unit 100 is, for instance, a display screen.

Moreover, in the present embodiment, the point stick 214 of the keyboard module 210 is surrounded by the buttons 212 and located at the center of the keyboard module 210. As shown in FIG. 2A, only the physical point stick 214 and the buttons 212 are disposed on the operation surface of the keyboard module 210, and there is no other physical button. Besides, as illustrated in FIG. 2A, the keyboard module 210 and the silicone film 240 are arranged in an anterior-posterior manner; that is, the keyboard module 210 is close to a rotational axis end, and the silicone film 240 is close to the user end. Furthermore, the silicone film 240 provided in the present embodiment can be regarded as a protection film having an outer surface 241 and an inner surface 243, and the inner surface 243 has light-permeable patterns 242a of a plurality of first virtual buttons and light-permeable patterns 242b of a plurality of second virtual buttons. Herein, the silicone film 240 is embodied as a non-transparent silicone film, and the light-permeable patterns 242a of the first virtual buttons and the light-permeable patterns 242b of the second virtual buttons on the inner surface 243 of the silicon film 240 define the position of the virtual touch region 242.

With reference to FIG. 2A and FIG. 2B, the light-emitting module 220 provided in the present embodiment is located between the silicone film 240 and the touch module 230. The first light-emitting unit 220a and the second light-emitting unit 220b of the light-emitting module 220 correspond to the light-permeable patterns 242a of the first virtual buttons and the light-permeable patterns 242b of the second virtual buttons, respectively. The first light-emitting unit 220a includes a plurality of first light-emitting diodes 222 separated from each other, the second light-emitting unit 220b includes a plurality of second light-emitting diodes 224 separated from each other, and the first light-emitting diodes 222 surround the second Light-emitting diodes 224. Herein, the positions of the first light-emitting diodes 222 are different from the positions of the second light-emitting diodes 224, and the first light-emitting diodes 222 and the second light-emitting diodes 224 can emit light of the same color or light of different colors, which should not be construed as limitations in the disclosure.

It should be mentioned that the positions of the first light-emitting diodes 222 need not be consistent with the positions of the light-permeable patterns 242a of the first virtual buttons, and the positions of the second light-emitting diodes 224 and the positions of the light-permeable patterns 242b of the second virtual buttons need not be consistently corresponding. The light emitted by the first light-emitting diodes 222 and the second light-emitting diodes 224 is refracted by a light guide plate (not shown) or other internal elements and is then transmitted to the silicone film 240, and the light emitted by the first light-emitting diodes 222 and the second light-emitting diodes 224 can penetrate the light-permeable patterns 242a of the first virtual buttons and the light-permeable patterns 242b of the second virtual buttons to show the position of the virtual touch region 242.

With reference to FIG. 2C and FIG. 2D again, the touch module 230 provided in the present embodiment has a first surface 231 and a second surface 233 opposite to each other. The sensing layer 234 covers the first surface 231, and the control chip 232 is located on the second surface 233. In addition, the touch module 230 provided in the present embodiment further includes a metal film button 236 disposed on the second surface 233 and electrically connected to the control chip 232. Herein, the main function of the metal film button 236 is to provide a tactile sensation of a pressing stroke.

Figure 3A:
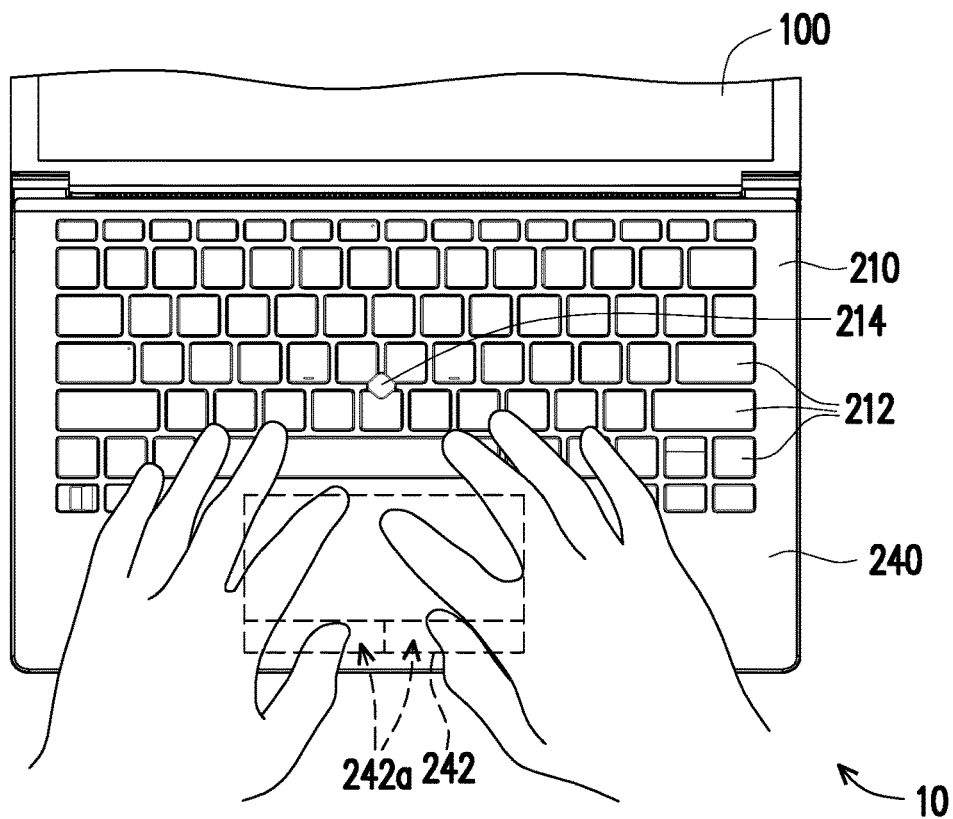
FIG. 3A is a schematic view illustrating the electronic device depicted in FIG. 1 in a first mode.
Figure 4:
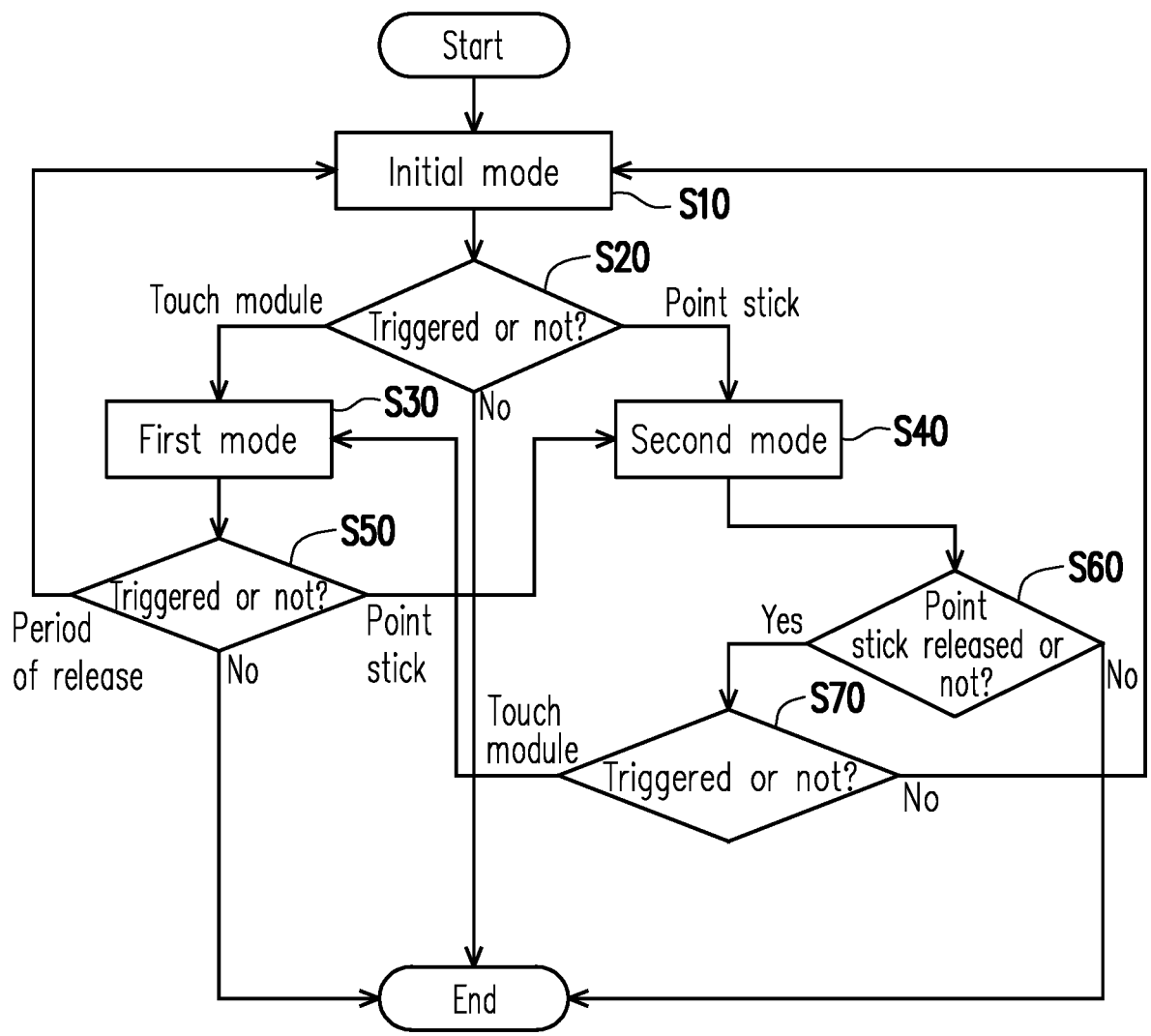
FIG. 4 is a flow chart illustrating an operation mode of the electronic device depicted in FIG. 1.

FIG. 3A is a schematic view illustrating the electronic device depicted in FIG. 1 in a first mode. FIG. 3A is a schematic view illustrating the electronic device depicted in FIG. 1 in a second mode. FIG. 4 is a flow chart illustrating an operation mode of the electronic device depicted in FIG. 1. With reference to FIG. 2E, FIG. 3A, and FIG. 4, when the electronic device 10 provided in the embodiment is to be used in step S10, the electronic device 10 is in an initial mode. At this time, the control chip 232 does not drive the light-emitting module 220, the sensing layer 234, and the metal film button 236.

Next, in step S20, whether the point stick 214 or the touch module 230 is triggered or not is determined. If neither the point stick 214 nor the touch module 230 is triggered, the operation mode ends. If the touch module 230 is triggered, i.e., when the virtual touch region 242 of the silicone film 240 is pressed to activate a first mode (step S30), the control chip 232 drives the first light-emitting unit 220a to emit light and displays the light-permeable patterns 242a of the first virtual buttons in the virtual touch region 242 (i.e., displays the positions of the first virtual buttons) to provide a more intuitive operational experience. In the first mode, the control chip 232 drives the sensing layer 234 to activate a position sensing function of the sensing layer 234 and a cursor control function of the sensing layer 234 and trigger the metal film button 236, so that the user can clearly feel the action of pressing the buttons. At this time, in the first mode, a cursor control function of the point stick 214 is substantially deactivated.

Then, in the first mode, in step S50, whether the virtual touch region 242 of the silicone film 240 is continuously triggered is determined; alternatively, the point stick 214 is triggered. If the user does not continuously use the virtual touch region 242 of the silicone film 240, after a period of release, the operation mode returns to the initial mode. If neither the virtual touch region 242 nor the point stick 214 is triggered, the operation mode ends. If the user presses the point stick 214 and triggers the point stick 214, the first mode is switched to a second mode.

Figure 3B:
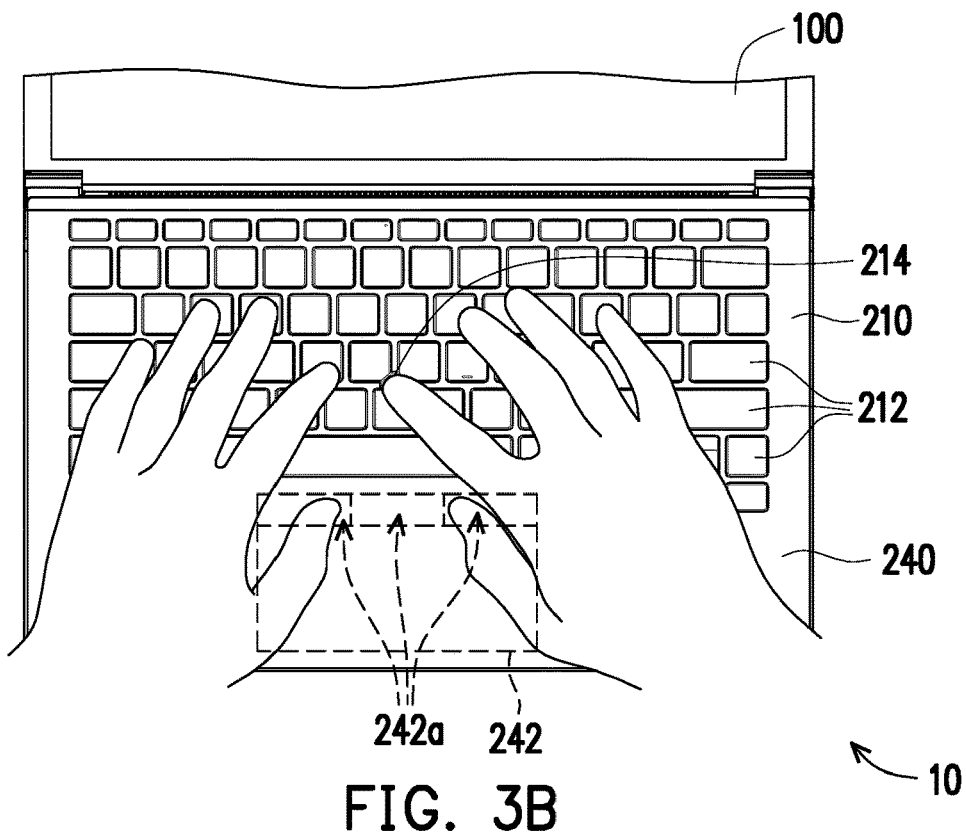
FIG. 3B is a schematic view illustrating the electronic device depicted in FIG. 1 in a second mode.

On the other hand, with reference to FIG. 2E, FIG. 3B, and FIG. 4, in step 20, if it is determined that the point stick 214 is triggered, i.e., when the point stick 214 of the keyboard module 210 is pressed to start the second mode (in step S40), the control chip 232 drives the second light-emitting unit 220b to emit light and displays the light-permeable patterns 242b of the second virtual buttons in the virtual touch region 242 (i.e., displays the positions of the second virtual buttons) to provide a more intuitive operational experience. As shown in FIG. 3A and FIG. 3B, the positions of the light-permeable patterns 242a of the first virtual buttons are different from the positions of the light-permeable patterns 242b of the second virtual buttons, and the light-permeable patterns 242b of the second virtual buttons are located between the light-permeable patterns 242a of the first virtual buttons and the buttons 212. In addition, the number of light-permeable patterns 242b of the second virtual buttons (e.g., three buttons including left, right, and middle buttons) is greater than the number of light-permeable patterns 242a of the first virtual buttons (e.g., two buttons including left and right buttons), which should however not be construed as a limitation in the disclosure.

To be specific, in the second mode, the control chip 232 does not drive the sensing layer 234, so as to activate position sensing function of the sensing layer 234, activate the cursor control function of the point stick 214, and trigger the metal film button 236; thereby, the user is allowed to feel the action of pressing the button. At this time, in the second mode, the cursor control function of the sensing layer 234 is substantially deactivated.

Next, in the second mode, it is determined whether the point stick 214 is released in step 60; namely, the point stick 214 is neither pressed nor pushed to move by the user. If the point stick 214 is released, see step 70. On the other hand, if the point stick 214 is not released, it means that the user continues to press or push the point stick 214, i.e., the operation mode still remains as the second mode.

In step 70, it is necessary to determine again whether the point stick 214 or the touch module 230 is triggered. If neither the point stick 214 nor the touch module 230 is triggered, the operation mode then returns to the initial mode; if the touch module 230 is triggered, the second mode is switched to the first mode.

In other words, according to the mode switching method of the electronic device 100, whether the trigger signal exists is detected first. If the trigger signal does not exist, the existing state or the existing function of the first light-emitting unit 220a, the second light-emitting unit 220b, the touch module 230, and the point stick 214 is then maintained. If the trigger signal exists and is the trigger signal of the touch module 230, the first light-emitting unit 220a is turned on, the second light-emitting unit 220b is turned off, the cursor control function of the touch module 230 is activated, the position sensing function of the touch module 230 is activated, and the cursor control function of the point stick 214 is deactivated. If the trigger signal exists and is the trigger signal of point stick 214, the first light-emitting unit 220a is turned off, the second light-emitting unit 220b is turned on, the cursor control function of the touch module 230 is deactivated, the position sensing function of the touch module 230 is activated, and the cursor control function of the point stick 214 is activated. If the trigger signal exists and is a time trigger signal, the first light-emitting unit 220a is turned off, the second light-emitting unit 220b is turned off, the cursor control function of the touch module 230 is activated, the position sensing function of the touch module 230 is activated, and the cursor control function of the point stick 214 is deactivated.

In brief, through triggering the virtual touch region 242 or the point stick 214 by the user, the control chip 232 of the touch module 230 can respectively drive the first light-emitting unit 220a or the second light-emitting unit 220b, and the user can learn the positions of the light-permeable patterns 242a of the first virtual buttons and the light-permeable patterns 242b of the second virtual buttons in the virtual touch region 242 through the light emitted by the first light-emitting unit 220a or the second light-emitting unit 220b. As a result, the user can obtain the more intuitive operational experience. Through said design, in the electronic device 10 provided in the present embodiment, no layout space of the physical function buttons corresponding to the point stick is required, and thus the electronic device 10 can have the advantages of small volume and compactness.

It should be noted that, in the above embodiment, the keyboard module 210 and the silicone film 240 are arranged in an anterior-posterior manner, which should however not be construed as a limitation in the disclosure. In other embodiments, as shown in FIG. 5A, the keyboard module 210a is located at the lower portion, the silicone film 240a is located above the keyboard module 210a, and the buttons 212a of the keyboard module 210a penetrate button openings 245a of the silicone film 240a; alternatively, as shown in FIG. 5B, the keyboard module 210b is located at the lower portion, the silicone film 240b is located above the keyboard module 210b, and the silicone film 240b completely covers the buttons 212b of the keyboard module 210b. Herein, the silicone films 240a and 240b are embodied as transparent silicone films.

Figure 6A:
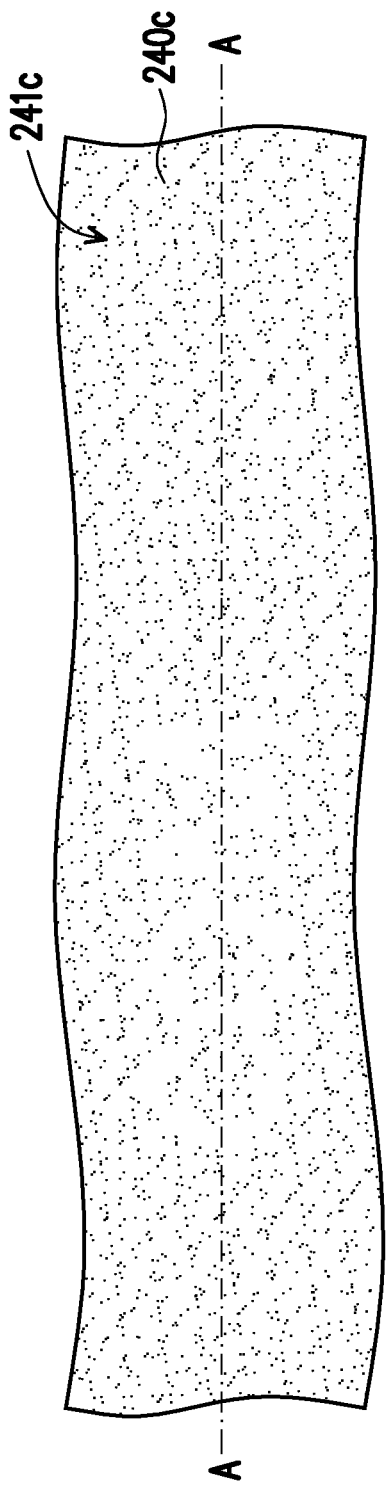
FIG. 6A is a schematic partial top view illustrating a silicone film according to an embodiment of the disclosure.
Figure 6B:
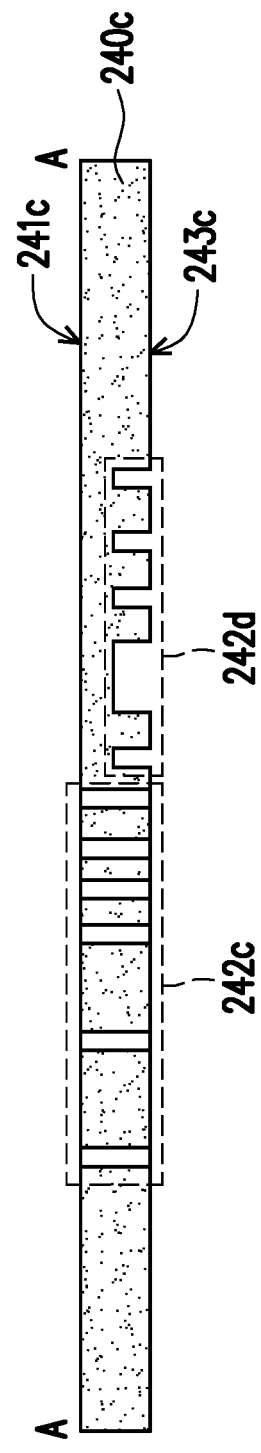
FIG. 6B is a schematic cross-sectional view taken along a line A-A of FIG. 6A.

In addition, the structural types of a plurality of different protection films will be described below. FIG. 6A is a schematic partial top view illustrating a silicone film according to an embodiment of the disclosure. FIG. 6B is a schematic cross-sectional view taken along a line A-A of FIG. 6A. With reference to FIG. 6A and FIG. 6B, in this embodiment, the silicone film 240c is embodied as a non-transparent silicone film and can be regarded as a protection film. Herein, the silicone film 240c has light-permeable patterns 242c (i.e., a through-hole structure) of a plurality of virtual buttons penetrating the silicone film 240c and communicating with the outer surface 241c and the inner surface 243c as well as light-permeable patterns 242d (i.e., a groove structure) of the virtual button extending from the inner surface 243c toward the outer surface 241c and located in the silicone film 240c. Herein, the light-permeable patterns 242c of the virtual buttons allows the light to completely pass through, and the light passing through the light-permeable patterns 242d of the virtual buttons has a brightness less than that of the light passing through the light-permeable patterns 242c of the virtual buttons. It should be mentioned that the silicone films 240, 240a, and 240b provided in the previous embodiments have substantially the same structural form as that of the silicone film 240c, which should however not be construed as a limitation in the disclosure.

Figure 7A:
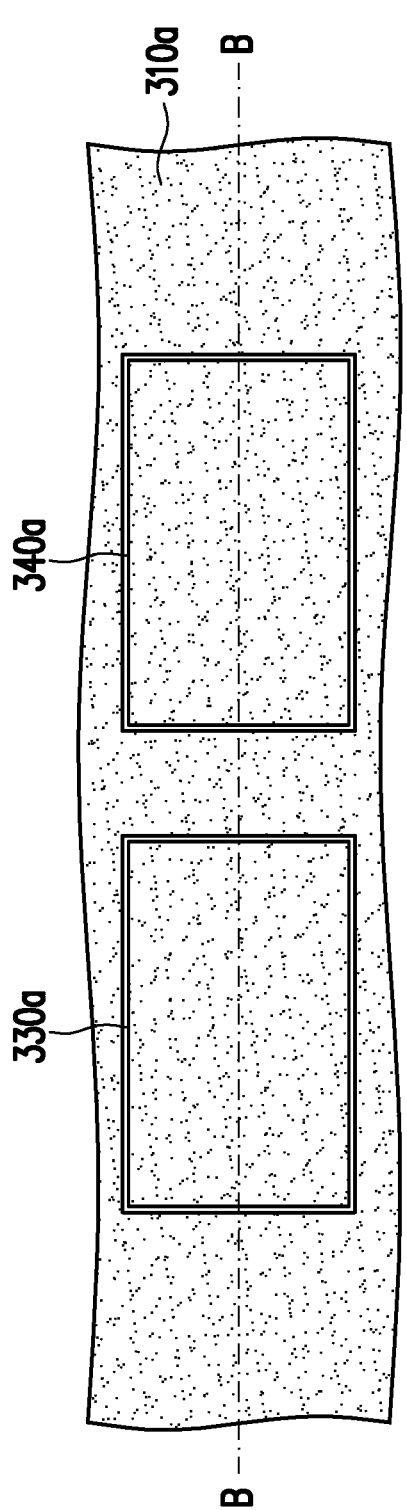
FIG. 7A is a schematic partial top view illustrating a protection film according to an embodiment of the disclosure.
Figure 7B:
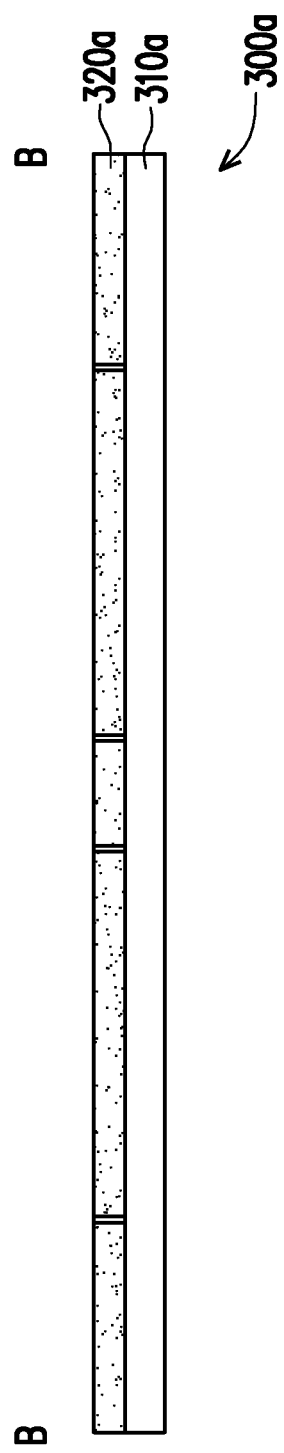
FIG. 7B is a schematic cross-sectional view taken along a line B-B of FIG. 7A.

FIG. 7A is a schematic partial top view illustrating a protection film according to an embodiment of the disclosure. FIG. 7B is a schematic cross-sectional view taken along a line B-B of FIG. 7A. With reference to FIG. 7A and FIG. 7B, in the present embodiment, the protection film 300a includes a transparent body layer 310a and a non-transparent ink layer 320a. The non-transparent ink layer 320a is coated on the transparent body layer 310a to define light-permeable patterns 330a of the first virtual buttons and light-permeable patterns 340a of the second virtual buttons. Herein, the non-transparent ink layer 320a is patterned and coated on the transparent body layer 310a; that is, the non-transparent ink layer 320a does not completely cover the transparent body layer 310a, thereby defining the light-permeable patterns 330a of the first virtual buttons and the light-permeable patterns 340a of the second virtual buttons.

Figure 8A:
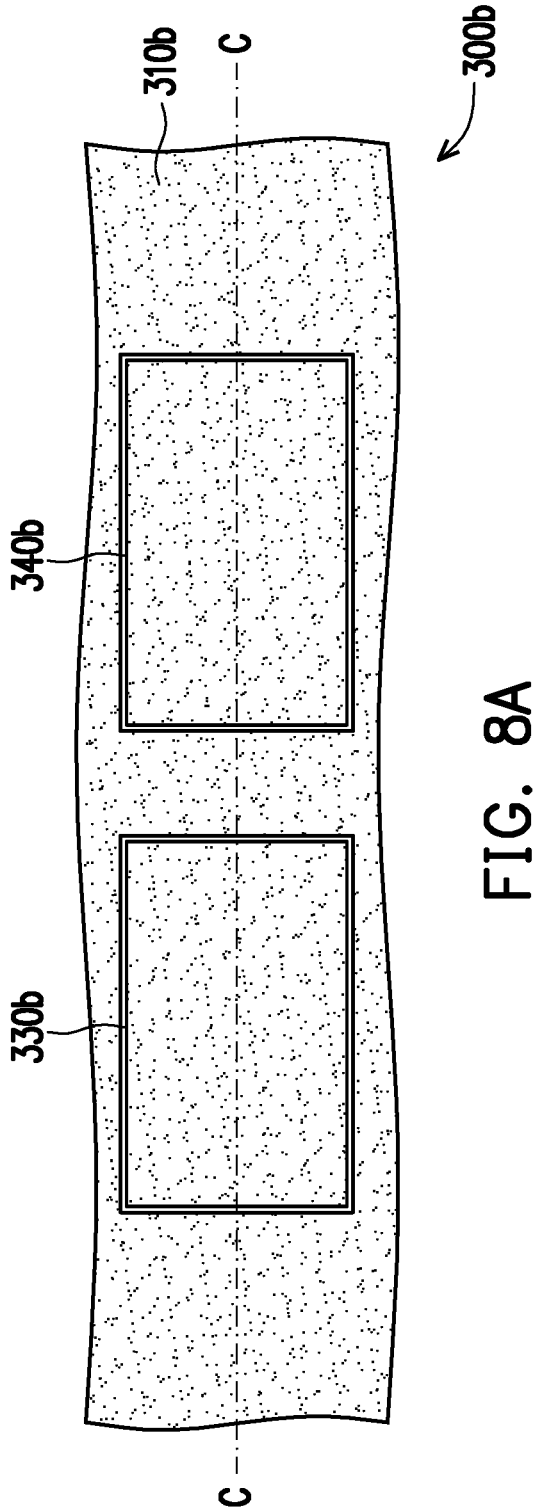
FIG. 8A is a schematic partial top view illustrating a protection film according to an embodiment of the disclosure.
Figure 8B:
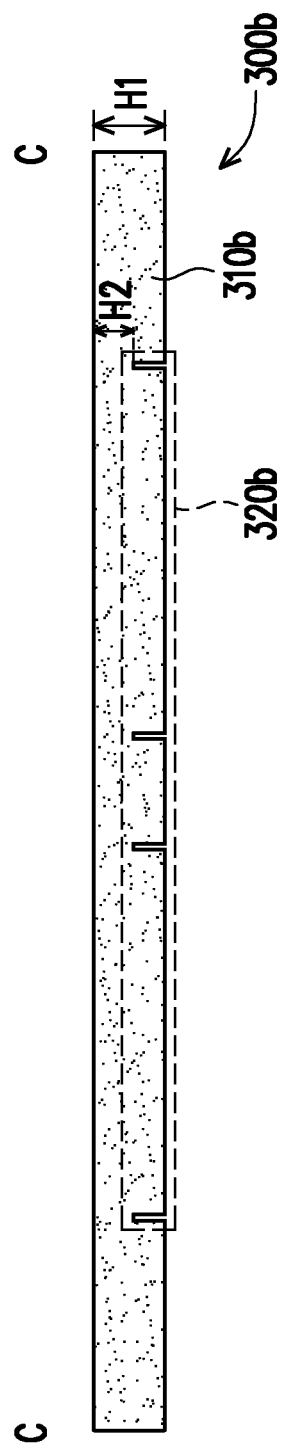
FIG. 8B is a schematic cross-sectional view taken along a line C-C of FIG. 8A.

FIG. 8A is a schematic partial top view illustrating a protection film according to an embodiment of the disclosure. FIG. 8B is a schematic cross-sectional view taken along a line C-C of FIG. 8A. With reference to FIG. 8A and FIG. 8B, in the present embodiment, the protection film 300b includes a non-transparent body layer 310b and a groove region 320b. The non-transparent body layer 310b has a first thickness H1, and the groove region 320b is distributed on the non-transparent body layer 310b and has a second thickness H2. The second thickness H2 of the groove region 320b is smaller than the first thickness H1 of the non-transparent body layer 310b to define light-permeable patterns 330b of the first virtual buttons and light-permeable patterns 340b of the second virtual buttons. That is, in the protection film 300b, the groove region 320b is formed on the non-transparent body layer 310b, thereby defining light-permeable patterns 330b of the first virtual buttons and light-permeable patterns 340b of the second virtual buttons.

To sum up, in the design of the electronic device provided herein, the silicone film has the virtual touch region, and the light-emitting module and the touch module are disposed corresponding to the virtual touch region. Hence, when the first mode is activated by pressing the virtual touch region of the silicone film, the control chip drives the first light-emitting unit to emit light and displays the positions of the light-permeable patterns of the first virtual buttons in the virtual touch region; when the second mode is activated by pressing the point stick of the keyboard module, the control chip drives the second light-emitting unit to emit light and displays the positions of the light-permeable patterns of the second virtual buttons in the virtual touch region. That is, in the virtual touch region, the display of the first light-emitting unit and the second light-emitting unit of the light-emitting module can provide two different operation modules for the user. Compared with the electronic device provided in the related art, the electronic device provided herein contributes to the reduction of the layout space of the physical function buttons corresponding to the point stick and has the advantages of small volume and compactness.

Although the disclosure has been disclosed with the above embodiments, it is not intended to limit the disclosure. Any person having ordinary skill in the art can make some changes and modifications without departing from the spirit and scope of the disclosure. Therefore, the protection scope of the disclosure shall be defined by the appended claims.

What is claimed is:

1. An electronic device, comprising:
a keyboard module, having a plurality of buttons and a point stick;
a silicone film, having a virtual touch region;
a light-emitting module, disposed below the silicone film and corresponding to the virtual touch region, the light-emitting module comprising a first light-emitting unit and a second light-emitting unit; and
a touch module, disposed below the silicone film and corresponding to the virtual touch region, the touch module comprising a control chip and a sensing layer, wherein the point stick, the first light-emitting unit, the second light-emitting unit, and the sensing layer are respectively electrically connected to the control chip,
wherein when a first mode is activated by pressing the virtual touch region of the silicone film, the control chip drives the first light-emitting unit to emit light and displays positions of a plurality of first virtual buttons in the virtual touch region,
wherein when a second mode is activated by pressing the point stick of the keyboard module, the control chip drives the second light-emitting unit to emit light and displays positions of a plurality of second virtual buttons in the virtual touch region.

2. The electronic device of claim 1, wherein the light-emitting module is located between the silicone film and the touch module.

3. The electronic device of claim 1, wherein in the first mode, the control chip drives the sensing layer to activate a position sensing function of the sensing layer and a cursor control function of the sensing layer but deactivate a cursor control function of the point stick.

4. The electronic device of claim 1, wherein in the second mode, the control chip drives the sensing layer to activate a position sensing function of the sensing layer but deactivate a cursor control function of the sensing layer and activate a cursor control function of the point stick.

5. The electronic device of claim 1, wherein the plurality of second virtual buttons are located between the plurality of first virtual buttons and the plurality of buttons.

6. The electronic device of claim 1, wherein the touch module has a first surface and a second surface opposite to each other, the sensing layer covers the first surface, and the control chip is located on the second surface.

7. The electronic device of claim 6, wherein the touch module further comprises a metal film button disposed on the second surface and electrically connected to the control chip.

8. The electronic device of claim 1, wherein the first light-emitting unit comprises a plurality of first light-emitting diodes separated from each other, and the second light-emitting unit comprises a plurality of second light-emitting diodes separated from each other.

9. The electronic device of claim 8, wherein the plurality of first light-emitting diodes surrounds the plurality of second light-emitting diodes.

10. The electronic device of claim 1, further comprising:
a display unit, the keyboard module, the light-emitting module, and the touch module defining a host, the display unit being pivoted to the host and electrically connected to the host.

11. A mode switching method of an electronic device, comprising:
providing the electronic device described in claim 1;
detecting whether a trigger signal exists by the control chip; and
maintaining an existing state or an existing function of the first light-emitting unit, the second light-emitting unit, the touch module, and the point stick by the control chip if the trigger signal does not exist.

12. The mode switching method of the electronic device of claim 11, wherein if the trigger signal exists and is a trigger signal of the touch module,
turning on the first light-emitting unit;
turning off the second light-emitting unit;
activating a cursor control function of the touch module;
activating a position sensing function of the touch module; and
deactivating a cursor control function of the point stick.

13. The mode switching method of the electronic device of claim 11, wherein if the trigger signal exists and is a trigger signal of the point stick:
turning off the first light-emitting unit;
turning on the second light-emitting unit;
deactivating a cursor control function of the touch module;
activating a position sensing function of the touch module; and
activating a cursor control function of the point stick.

14. The mode switching method of the electronic device of claim 11, wherein if the trigger signal exists and is a time trigger signal:
turning off the first light-emitting unit;
turning off the second light-emitting unit;
activating a cursor control function of the touch module;
activating a position sensing function of the touch module; and
deactivating a cursor control function of the point stick.

15. An electronic device, comprising:
a keyboard module, having a plurality of buttons and a point stick;
a protection film, having an outer surface and an inner surface, the inner surface having light-permeable patterns of a plurality of first virtual buttons and light-permeable patterns of a plurality of second virtual buttons;

a light-emitting module, disposed below the protection film and comprising a first light-emitting unit and a second light-emitting unit respectively corresponding to the light-permeable patterns of the plurality of first virtual buttons and the light-permeable patterns of the plurality of second virtual buttons; and a touch module disposed below the protection film, wherein when a first mode is activated by pressing a virtual touch region of the protection film, a control chip drives the first light-emitting unit to emit light and displays positions of the plurality of first virtual buttons in the virtual touch region, wherein when a second mode is activated by pressing the point stick of the keyboard module, the control chip drives the second light-emitting unit to emit light and displays positions of the plurality of second virtual buttons in the virtual touch region.

16. The electronic device of claim 15, wherein the protection film comprises:

a transparent body layer; and a non-transparent ink layer coated on the transparent body layer to define the light-permeable patterns of the plurality of first virtual button and the light-permeable patterns of the plurality of second virtual buttons.

17. The electronic device of claim 15, wherein the protection film comprises:

a non-transparent body layer having a first thickness; and a groove region distributed on the non-transparent body layer and having a second thickness, wherein the second thickness is less than the first thickness to define the light-permeable patterns of the plurality of first virtual buttons and the light-permeable patterns of the plurality of second virtual buttons.

18. The electronic device of claim 15, further comprising:

the control chip electrically connected to the point stick, the first light-emitting unit, the second light-emitting unit, and the touch module.

* * * * *